2,749,298

PREPARATION OF AROMATIC AMINES

Charles L. Thomas, Swarthmore, Pa., assignor to Sun Oil Company, Philadelphia, Pa., a corporation of New Jersey No Drawing. Application November 5, 1953, Serial No. 390,409

3 Claims. (Cl. 204—168)

This invention relates to the preparation of amino derivatives of aromatic hydrocarbons, and specifically relates to the preparation of aromatic amines of the benzene series.

Methods heretofore described for the preparation of aromatic amines generally involve multi-step processes wherein an aromatic hydrocarbon is converted to a derivative which in turn is converted to the amine. For example, benzene is converted to nitrobenzene which is then reduced to aniline, or benzene is converted to chlorobenzene which is then reacted with ammonia to produce aniline. Due to the several reactions required by such multi-step processes, the apparatus employed is complicated and the technique of operation difficult. Corrosive reagents are required, which necessitate special and expensive materials of construction, and frequently present a disposal problem of waste materials.

An object of the present invention is to provide a process for the preparation of aromatic amines from benzene hydrocarbons in a single step. A further object is to provide a commercially feasible process for the direct conversion of an aromatic hydrocarbon to an amine. Another object is to provide a process for the preparation of aromatic amines which does not require complicated apparatus of special materials of construction. A still further object is to eliminate the need for corrosive reagents in the production of aromatic amines. Other objects will be apparent from the following specification.

It has now been found that by passing a mixture of an aromatic hydrocarbon and ammonia through a non-disruptive electric discharge, the aromatic hydrocarbon and ammonia react to form hydrogen and the amino derivative of the aromatic hydrocarbon.

In a specific embodiment of the process of the invention, a mixture containing benzene and ammonia is passed, in vapor phase, through an electric glow discharge. Aniline and hydrogen are the products recovered from the effluent mixture. The process of the invention thus provides a single step process for the production of aromatic amines in which the need for complicated apparatus constructed of special materials, difficult operational techniques and corrosive reagents is eliminated. Although the mechanism of the reaction is not known with certainty, the overall reaction can be represented by the equation:

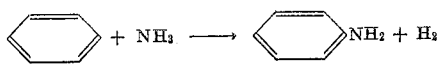

By the term, "non-disruptive electric discharge," and terms of similar import as used herein, is meant the types of electric discharge wherein visible arcing or sparking between electrodes it at least substantially prevented, and which are known to produce ozone from oxygen. Silent electric discharges, corona discharges and brush discharges illustrate suitable non-disruptive discharges which can be employed. Such non disruptive electric discharges are obtained by using an alternating current potential having a frequency of from about 50 cycles per second to 10,000 kilocycles per second at voltages of from about 500 to 30,000 volts. Best results are obtained with what may be termed a true silent electrical discharge used in an apparatus such as an ozonator, i. e., apparatus used to convert oxygen to ozone. In ozonators, the electrodes are separated by an insulator to prevent arcing. The electrodes collect charges of ions during ½ cycle of the alternating current and release them when the polarity reverses. Non-disruptive discharges operate at relatively high temperatures so that cooling means are preferably employed for adjacent portions of the apparatus.

Aromatic hydrocarbons which can be employed in the process of the invention are those of the benzene series which have at least one replaceable hydrogen atom attached to a carbon atom of the aromatic nucleus. Benzene, toluene, ethylbenzene, n-propylbenzene, isopropylbenzene, ortho-xylene, meta-xylene, para-xylene, 1,2,3-trimethylbenzene, 1,2,4-trimethylbenzene, 1,2-diethylbenzene, 2-ethyltoluene, and normal butyl benzene illustrate the aromatic hydrocarbons which give good results. The aromatic hydrocarbon must not have more than 5 alkyl substitutents and preferably does not have more than 4 alkyl substituents. It is also preferred that the alkyl substituents attached to the aromatic nucleus should have not more than about 5 carbon atoms, since higher alkyl substituents tend to cleave in the process.

It is preferred to supply a mixture of aromatic hydrocarbon and ammonia to the non-disruptive discharge in vapor phase, but liquid phase operation can be employed if desired. Pressures of from about 5 millimeters of mercury absolute pressure up to about 100 p. s. i. can be employed. In general, the pressure is adjusted to give maximum electrical efficiency. The time the reactants are subjected to the discharge is adjusted to secure an efficient conversion of the aromatic to the amino derivative, and will usually be from a fraction of a second, say about 0.01 second, to about 1 minute. The pressure and temperature employed can be such that the aromatic hydrocarbon is in liquid phase and the ammonia in vapor phase, in which case sufficient ammonia is in intimate contact with the aromatic hydrocarbon, particularly at relatively high pressure, to secure good results in the operation. The temperature of the mixture supplied to the glow discharge is preferably at a temperature of from about 10° C. to 200° C.

The ratio of reactants to employ can be varied substantially and good results obtained therewith. It is preferred to employ a mole ratio of aromatic hydrocarbon to ammonia of from about 0.1:1 to 20:1.

To illustrate a specific embodiment of the process, benzene is vaporized and admixed, at a rate of about 36.8 pounds per hour, with vaporized ammonia, the mole ratio of benzene to ammonia being maintained at about 2:1. The resulting mixture, in vapor phase at a temperature of about 90° C., is passed at atmospheric pressure through a silent electric discharge. Hydrogen and unreacted ammonia are removed from the effluent reaction stream. The remaining products, aniline and unreacted benzene, are separated, aniline being recovered at a rate of about 2 pounds per hour. The recovered benzene is advantageously recycled to the process.

When other aromatic hydrocarbons are substituted for benzene, the amino derivatives thereof are produced in the process with substantially equivalent results. For example, toluidine is prepared from toluene and xylidine is prepared from xylene, it being understood that the products in such instances consist of a mixture of isomers.

Another embodiment of the process is the substitution of actinic light for the non-disruptive electric discharge. In this embodiment a mixture of an aromatic hydrocarbon and ammonia is subjected to irradiation so that the aromatic hydrocarbon, ammonia, or both, is activated. Reaction between the ammonia and aromatic hydrocarbon then occurs to form hydrogen and the amino derivative of the aromatic hydrocarbon. By "actinic light" is meant irradiations generally in the ultraviolet range having a wave length from about 5000 to about 1000 angstrom units. The source of actinic light is preferably a mercury arc operated in a fused silica tube, but other sources such as rare-gas lamps and enclosed carbon-flame arcs can be employed with good results. Such sources of ultraviolet light are preferably operated in apparatus constructed of fused silica, special phosphate glasses, crystal quartz, or lithium fluoride, depending upon the wave length of the ultraviolet light desired. In operating the process, it is important that both the aromatic hydrocarbon and ammonia be maintained in the gas phase during exposure to the actinic light.

If desired, two sources of actinic light supplying irradiations of different wave lengths into a single reaction chamber may be employed, one wave length being especially suitable for the dissociation of ammonia and the other wave length being especially suitable for the dissociation of the aromatic hydrocarbon into a hydrogen atom and an aryl radical. A still further embodiment is to expose separately streams of ammonia and aromatic hydrocarbon to actinic light and to combine the streams from the exposure chambers immediately thereafter, so that the activated materials are brought into immediate contact.

In this embodiment, as for the non-disruptive electric discharge embodiment, aniline, toluidine, and xylidine are prepared from benzene, toluene, and xylene, respectively, it again being understood that the products in some instances consist of a mixture of isomers.

The invention claimed is:

1. Process for the preparation of aromatic amino hydrocarbons which comprises forming a liquid phase mixture of an aromatic hydrocarbon having a replaceable hydrogen atom attached to the aromatic nucleus with ammonia, the mole ratio of said aromatic hydrocarbon to ammonia being from 0.1:1 to 20:1, passing the mixture through a non-disruptive electric glow discharge, and recovering an aromatic amino hydrocarbon from the reaction mixture.

2. Process according to claim 1 wherein said aromatic hydrocarbon having a replaceable hydrogen atom attached to the aromatic nucleus is benzene.

3. Process according to claim 1 wherein said aromatic hydrocarbon having a replaceable hydrogen atom attached to the aromatic nucleus is toluene.

References Cited in the file of this patent

UNITED STATES PATENTS

| | | |
|---|---|---|
| 1,307,931 | Schmidt et al. | June 24, 1919 |
| 1,994,243 | Egloff et al. | Mar. 12, 1935 |
| 2,334,377 | Bennett | Nov. 16, 1943 |